May 5, 1964 S. J. LAWRENCE 3,131,591
MUSIC TRAINING AID
Filed May 18, 1963 2 Sheets-Sheet 1
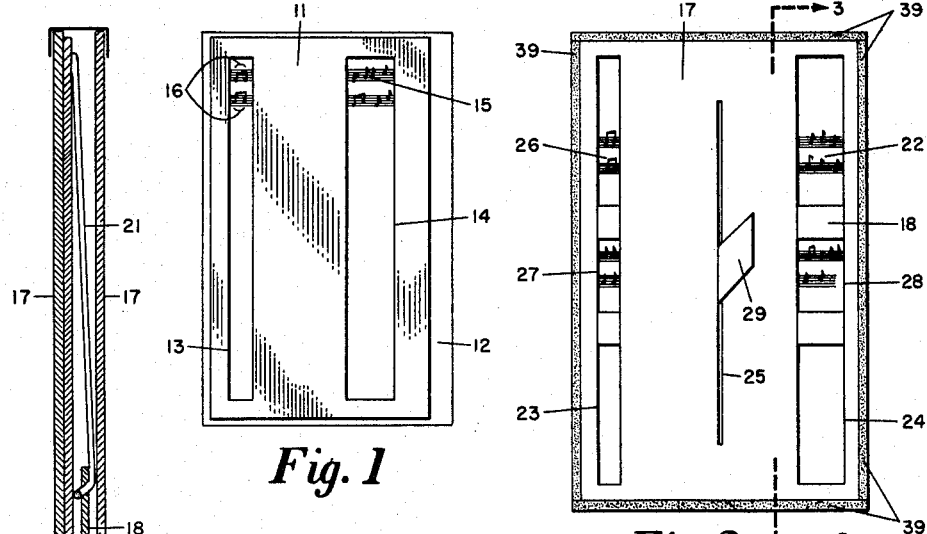
Fig. 1
Fig. 2
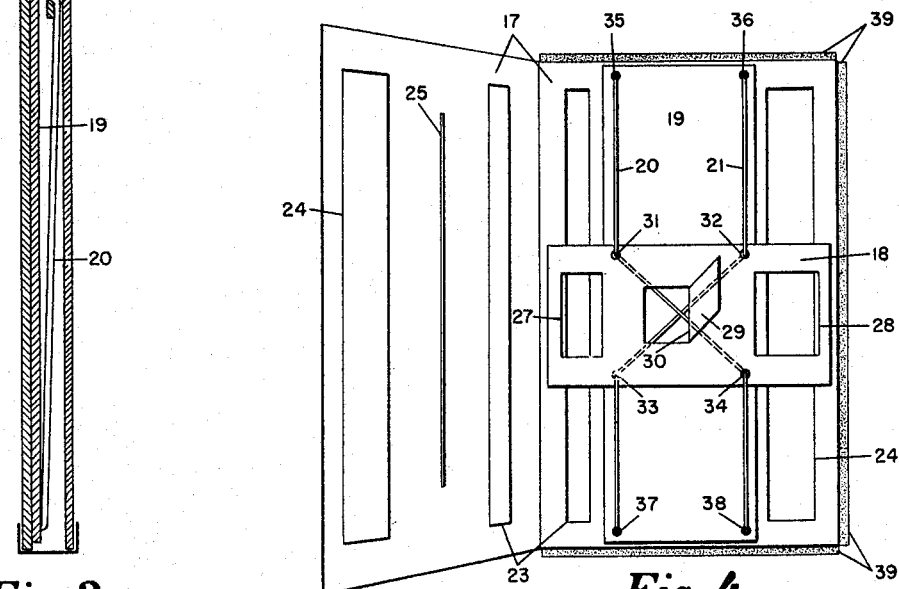
Fig. 3
Fig. 4
INVENTOR.
SIDNEY J. LAWRENCE
BY
ATTORNEY May 5, 1964

S. J. LAWRENCE 3,131,591

MUSIC TRAINING AID

Filed May 18, 1963

*INVENTOR.*
*SIDNEY J. LAWRENCE*
BY

ATTORNEY

United States Patent Office 3,131,591
Patented May 5, 1964

3,131,591
MUSIC TRAINING AID
Sidney J. Lawrence, 229 Oakford St.,
West Hempstead, N.Y.
Filed Mar. 18, 1963, Ser. No. 265,788
17 Claims. (Cl. 84—471)

This invention relates to a novel and useful music training aid. In particular it relates to an aid useful in training students of the piano, organ, accordion, or other similar instruments to play with both hands simultaneously.

Music for piano, organ, accordion and similar instruments is written in two staves or clefs, one for each hand. These are always read and played simultaneously. By far the student's greatest difficulty in playing such instruments is learning to read both staves of music at one time and coordinate his hands to the music. This is not true of the violinist, clarinetist, etc. Their music has only one clef and they read their music as fast or faster than they can play their instrument. However, the student of the piano, for example, first struggles through his reading until he is well acquainted with the notes, then, partially memorized, he is able to play with continuity and speed. While this impresses at first, later on it proves to be very frustrating.

Indeed, educators have complained of this part of piano education. They believe that sight reading music fluently should be the prime purpose of music education. They believe that by the time the student is finished he should have developed the skill of reading music as he reads a book, so that he could enjoy playing any type of music at will and at sight.

Teachers, however, have all glossed over this aspect, mostly because there was little that could be done about it. Indeed, little has been known about precisely why double-stave music is hard to sight read.

Accordingly, it is an object of this invention to provide a training aid for students of the piano, organ, accordion or other similar instrument.

Another object is to provide mechanical means whereby such students can learn to read double-stave music smoothly and with speed.

Still another object is to provide an aid whereby double stave music can be read, first vertically, then vertically and horizontally at the same time, thereby facilitating the process of learning and developing coordination.

A further object is to provide a screen capable of covering a sheet of music and exposing a limited number of music symbols.

A still further object is to provide a screen having a slideable sight opening whereby the attention of a student is focused on a limited number of music symbols on two staves of music.

Still another important object of this invention is to provide such a screen whose operating parts are all simple in construction and which, because of such simplicity, can be produced inexpensively and automatically with a view to supplying the public with an efficient training aid at a low cost.

Numerous other objects and advantages of this invention will be apparent as it is better understood from the following description, which, taken in connection with the accompanying drawings, discloses preferred embodiments thereof.

Referring to the drawings:

FIG. 1 is an elevational view of one embodiment of my invention and illustrating its use;

FIG. 2 is a front elevational view of another embodiment of my invention, illustrating its use;

FIG. 3 is a section view on an enlarged scale on the line 3—3 of FIG. 2; and

FIG. 4 is an elevational view inside of FIG. 2 and showing its construction.

Figure 6:
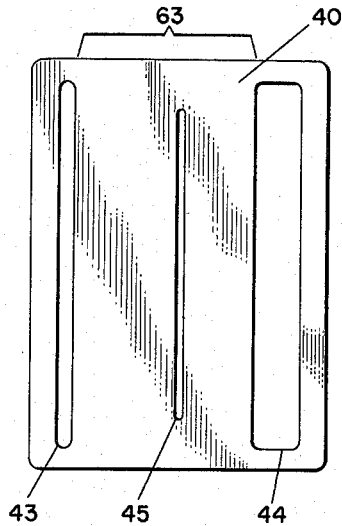
FIG. 6 is an elevational view of one component part of the embodiment of FIG. 5.

To illustrate one embodiment of this invention, and referring to FIGURE 1, I provide a music training aid comprising a screen 11 of a size suitable to cover a sheet of music 12 and having two vertical longitudinally extending windows 13 and 14, one on each side thereof. The windows 13 and 14 have widths suitable to expose a limited number of music symbols 15 of the sheet of music 12. In this example the window on the left side 13 is narrow and has a width of approximately three ⅛ notes of a measure of 6/8 time music of a normal size in which popular music is usually printed. The window on the right side 14 is wide and has a substantially larger width than the window on the left side 13. In this example that width is approximately three times the width of the window on the left side 13.

To illustrate the training aid in use, it is placed over the sheet of music 12 by the teacher with the narrow window 13 on the left so that only the first vertical group of notes 16 is exposed. An advantage here is that the entire page is blocked out and the student is no longer confused and distracted by the maze of other notes. He is able to concentrate on playing the one vertical line.

After the student plays these notes, the teacher moves the screen 11 to the next vertical group of notes. When this is played, the screen 11 is moved again, and so on, until the line is finished. The screen 11 is then moved back to the original position and the student starts on the next two staves below, following the same procedure.

After two or three lines are read and played in the above fashion, the student is ready to expand his vision to the horizontal as well as the vertical. The screen 11 is then turned 180 degrees so that the wider window 14 is on the left. In 6/8 time, an entire measure of music is now exposed, while the rest of the lines is blocked out. As the student plays each measure, the teacher, or an assistant moves the screen 11 from one measure to another, proceeding as above.

The final step is to remove the screen 11. The student then reads and plays the music from the beginning in normal fashion. An immediate improvement is noticeable.

To illustrate another embodiment of this invention and referring to FIGURES 2–4, I provide a music training aid comprising a screen envelope 17 and a vertically slideable window frame 18 disposed therein and supported therein by a window frame support 19 and guy lines 20 and 21.

The screen envelope 17 is of a size suitable to cover a sheet of music 22 and has two vertical longitudinally extending windows 23 and 24, one on each side thereof, and a vertical longitudinally extending guide slit 25 at the approximate center of its front face. The windows 23 and 24 have widths suitable to expose a limited number of music symbols 26 of the sheet of music 22. In this example, the window on the left side 23 is narrow and has a width of approximately three ⅛ notes of a measure of 6/8 time music of a normal size in which popular music is usually printed. The window on the right side 24 is wide and has a substantially larger width than the window on the left side 23. In this example that width is approximately three times the width of the left side 23.

The window frame 18 comprises a rectangular sheet of material having a longitudinal dimension approximating the horizontal width of the screen envelope 17. It has sight openings 27 and 28 on each longitudinal side thereof, each with a horizontal width approximately the width of the corresponding window on the screen envelope 17. Thus, in this example, the sight opening on the left 27 is slight larger in horizontal width than is the left window 23 of the screen envelope 17. Similarly, the sight opening on the right 28 is slightly larger in horizontal width than is the right window 24 on the screen envelope 17. Each sight opening has a vertical width corresponding to two staves of notes on the sheet of music 22.

The window frame 18 has a guide tab 29 at its approximate longitudinal center. In this example, the guide tab 29 is formed from and resistably bend to the window frame 18 by a hinge line 30.

The window frame 18 also has two parallel pairs of guy line openings 31–34 disposed around the guide tab.

The window frame support 19 comprises a rectangular sheet of material, disposed within the screen envelope 17. It has a longitudinal dimension approximating the longitudinal dimension of the screen envelope 17 and a width such that the sight openings 27 and 28 of the window frame 18 are unimpaired. The window frame support is also provided with fastening means 35–38, in this example, staples, at the corners thereof which fasten the guy lines 20 and 21 to the window frame support 19.

The guy lines 20 and 21 are threaded through the guy line openings 31–34 and attached by the fastening means 35–38 to the longitudinal ends of the window frame support 19. In this example, the guy lines 20 and 21 comprise two lines and are threaded diagonally through opposite guy line openings 31–34 and attached to the window frame support 19 by staples 35–38 at opposite diagonal corners thereof. Thus, referring to FIGURE 4, guy line 20 is fastened at 35, threaded through opening 31, runs diagonally under the window frame 18 to opening 34 where it emerges and is fastened at 38. Similarly, guy line 21 is fastened at 36, threaded through opening 32, runs diagonally under the window frame 18 to opening 33 where it emerges and is fastened at 37. The guy lines 20 and 21 and window frame support 19 give stability to the window frame 18.

The window frame 18, window frame support 19 and guy lines 20 and 21 are disposed within the screen envelope 17 such that the guide tab 29 projects through the guide slit 25. By grasping the guide tab 29 and moving it up or down, the window frame 18 is made to slide vertically within the screen envelope 17.

In this example the screen envelope 17 is sealed by means of tape 39 running along its edges.

In use the training aid of FIGURES 2–4 is used as described above for the simpler version of FIGURE 1. However, a big improvement is that as the student begins each new line, the window frame 18 is moved down so as to frame the particular notes of interest on all four sides. Thus, the training aid blocks out top and bottom as well as the sides of the notes to be played, thereby focusing the student's attention even more strongly.

Figure 5:
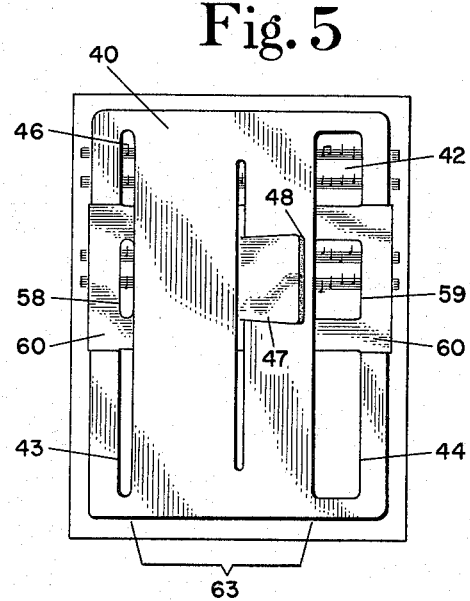
FIG. 5 is an elevational view of still another embodiment of my invention.
Figure 7:
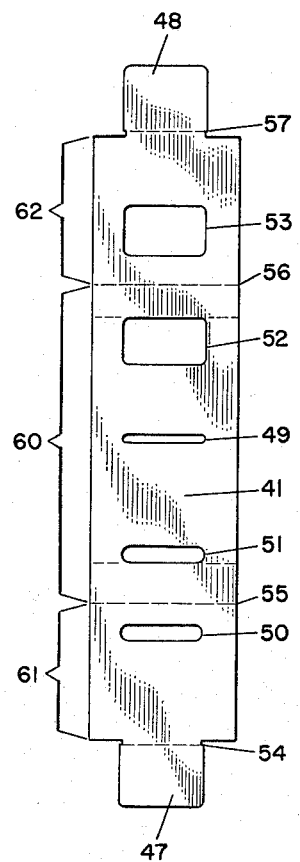
FIG. 7 is an elevational view of another component part of the embodiment of FIG. 5.

To illustrate still another embodiment of this invention and referring to FIGURES 5–7, I provide a music training aid constructed of only two pieces, a screen 40 with a window frame 41 in folded relation thereto.

The screen 40 is of a size suitable to cover a sheet of music 42 and has two vertical longitudinally extending windows 43 and 44, one on each side thereof, and a vertical longitudinally extending guide slit 45 at its approximate center. The windows 43 and 44 have widths suitable to expose a limited number of music symbols 46 of the sheet of music 42. In this example, the window on the left side 43 is narrow and has a width of approximately 3/8 notes of a measure of 6/8 time music of a normal size in which popular music is usually printed. The window on the right side 44 is wide and has a substantially larger width than the window on the left side 43. In this example that width is approximately three times the width of the left side 43.

The window frame 41 comprises a rectangular sheet of material having a horizontal longitudinal dimension approximating twice the horizontal width of the screen 40. It has guide tabs 47 and 48 at its opposite longitudinal ends, a vertically extending tab slit 49 at its approximate center and two sets of window frame openings 50–53. In this example, window frame openings 50 and 51 are on the left side and each has a width approximating that of window 43. Window frame openings 52 and 53 are on the right side and each has a width approximating that of window 44. Each of the window frame openings 50–53 have a vertical width corresponding to two staves of notes of the sheet of music 42.

The window frame 41 has fold lines 54–57 by which the window frame 41 can be inserted and be slideably secured within the screen 40. The window frame openings 50–53 guide tabs 47 and 48 and slit 49 are positioned so that when the window frame 41 lies in folded relation with the screen 40, the guide tabs 47 and 48 protrude through the guide slit 45 and each set of window frame openings 50, 51 and 52, 53, forms a sight opening 58 and 59 with the corresponding of each window 43 and 44 of the screen 40. In this example, the central portion 60 of the window frame 41 lies folded over the edges of the screen 40, through the windows 43 and 44 and behind the guide slit portion 63 of the screen 40, with the end portions 61 and 62 lying behind the screen 40, the window frame 41 being slideably secured to the screen 40 by the guide tabs 47 and 48 protruding through the tab slit 49 and the guide slit 45.

In this illustrated embodiment of the invention, the screen 40 is formed of a relatively thick material such as cardboard, thick paper or plastic sheet. The window frame 41 is formed of relatively thin flexible sheet material, such as paper or plasticized paper, capable of being folded and of being secured to the screen 40 in intertwining relation.

In use, the training aid of FIGURES 5–7 is used as described above for the embodiment of FIGURES 2–4. An advantage of this embodiment is that it is very economically manufactured, simple to assemble, and provides more positive control than the other embodiments.

In actual tests conducted with the training aid of FIGURES 2–4, seventy-three piano students were tested by five teachers for a period of two months. The following results were achieved.

(1) Improvements in sight reading were from partial to dramatic. The more serious the original problem, the more dramatic the improvements.

(2) There were many improvements in eye focusing as well as eye fusion.

(3) There was a dramatic lessening of "losing the place," a common problem with piano students.

(4) There were improvements in hand coordination.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

This application is a continuation-in-part of application Serial No. 198,047, filed May 28, 1962, entitled Music Training Aid.

I claim:

1. A music training aid comprising:
    (1) a screen of a size suitable to cover a sheet of music and having
        (a) a vertically extending window of a width suitable to expose a limited number of music symbols of said sheet of music, and
        (b) a vertically extending guide slit parallel to said window; and
    (2) a vertically slideable window frame having
        (a) a sight opening with a length corresponding to two staves of notes of said sheet of music, and
(b) a guide tab
said window frame being slideably disposed relative to said screen such that said guide tab protrudes through said guide slit.

2. A music training aid comprising:
(1) a screen envelope of a size suitable to cover a sheet of music and having
(a) a vertically extending window of a width suitable to expose a limited number of music symbols of said sheet of music, and
(b) a vertically extending guide slit on its front face;
(2) a vertically slideable window frame having
(a) a sight opening with a length corresponding to two staves of notes of said sheet of music, and
(b) a guide tab
said window frame being slideably disposed within said screen such that said guide tab projects through said guide slit.

3. A music training aid comprising:
(1) a screen of a size suitable to cover a sheet of music and having
(a) two vertically extending windows, one on each side of said screen, having widths suitable to expose a limited number of music symbols of said sheet of music, such that the width of one of said windows is substantially greater than the width of the other of said windows, and
(b) a vertically extending guide slit at the approximate center of said screen; and
(2) a vertically slideable window frame having
(a) sight openings corresponding to said windows with lengths corresponding to two staves of notes of said sheet of music, and
(b) a guide tab;
said window frame being slideably disposed relative to said screen such that said guide tab protrudes through said guide slit.

4. A music training aid comprising:
(1) a screen envelope of a size suitable to cover a sheet of music and having
(a) two vertically extending windows, one on each side of said screen, having widths suitable to expose a limited number of music symbols of said sheet of music, such that the width of one of said windows is substantially greater than the width of the other of said windows, and
(b) a vertically extending guide slit at the approximate center of its front face; and
(2) a vertically slideable window frame having
(a) sight openings corresponding to said windows with lengths corresponding to two staves of notes of said sheet of music, and
(b) a guide tab;
said window frame being slideably disposed relative to said screen such that said guide tab protrudes through said guide slit.

5. A music training aid comprising a screen of a size suitable to cover a sheet of music and having two vertically extending windows, one on each side thereof, said windows having widths suitable to expose a limited number of music symbols of said sheet of music such that the width of one of said windows is substantially greater than the width of the other of said windows.

6. The music training aid of claim 2 wherein said guide tab is formed from and resistably hinged to said window frame.

7. The music training aid of claim 6 wherein said window frame is stabilized by guy line means.

8. A music training aid comprising:
(1) a screen envelope of a size suitable to cover a sheet of music and having
(a) a vertically extending window of a width suitable to expose a limited number of music symbols of said sheet of music, and
(b) a vertically extending guide slit on its front face;
(2) a vertically slideable window frame comprising a rectangular sheet of material having a longitudinal dimension approximating the width of said screen and having
(a) a guide tab formed from and resistably hinged to said window frame by a bend line,
(b) two parallel pairs of guy line openings disposed around said guide tab, and
(c) a sight opening having a width approximating the width of said window and a length corresponding to two staves of notes of said sheet of music;
(3) a window frame support comprising a rectangular sheet of material, disposed within said screen envelope, having a longitudinal dimension approximating the longitudinal dimension of said screen envelope and a width such that said sight opening is unimpaired; and
(4) guy lines, threaded through said guy line openings and attached to the longitudinal ends of said window frame support, thereby providing stability to said window frame;
said window frame being slideably disposed within said screen such that said guide tab projects through said guide slit.

9. The music training aid of claim 8 wherein said guy lines comprise two lines and are threaded diagonally through opposite guy line openings and attached to said window frame support at opposite diagonal corners thereof.

10. A music training aid comprising:
(1) a screen of a size suitable to cover a sheet of music and having two vertically extending windows, one on each side thereof, said windows having widths suitable to expose a limited number of music symbols of said sheet of music, such that the width of one of said windows is substantially greater than the width of the other of said windows; and
(2) vertically slideable means for framing two staves of said sheet of music within a sight opening.

11. A music training aid comprising:
(1) a screen of a size suitable to cover a sheet of music and having two vertically extending windows, one on each side thereof, said windows having widths suitable to expose a limited number of music symbols of said sheet of music, such that the width of one of said windows is substantially greater than the width of the other of said windows;
(2) a vertically slideable window frame comprising a rectangular sheet of material having a longitudinal dimension approximating the width of said screen and having sight openings on each longitudinal side thereof, each with a width approximating the width of the corresponding of said windows, and with lengths corresponding to two staves of notes of said sheet of music; and
(3) means for sliding said window frame along the longitudinal axis of said screen.

12. The music training aid of claim 4 wherein said guide tab is formed from and resistably hinged to said window frame.

13. The music training aid of claim 12 wherein said window frame is stabilized by guy line means.

14. A music training aid comprising:
(1) a screen envelope of a size suitable to cover a sheet of music and having
(a) two vertically extending windows, one on side thereof, said windows having widths suitable to expose a limited number of music symbols of said sheet of music, such that the width of one of said windows is substantially greater than the width of the other of said windows, and
(b) a vertically extending guide slit at the approximate center of its front face;
(2) a vertically slideable window frame comprising a rectangular sheet of material having a longitudinal dimension approximating the width of said screen and having
    (a) a guide tab at its approximate center, formed from and resistably hinged to said window frame by a bend line,
    (b) two parallel pairs of guy line openings disposed around said guide tab, and
    (c) sight openings on each longitudinal side thereof, each with a width approximating the width of the corresponding of said windows, and with vertical widths corresponding to two staves of notes of said sheet of music;
(3) a window frame support comprising a rectangular sheet of material disposed within said screen envelope, having a longitudinal dimension approximating the longitudinal dimension of said screen envelope and a width such that said sight openings are unimpaired; and
(4) guy lines, threaded through said guy line openings and attached to the longitudinal ends of said window frame support, thereby providing stability to said window frame;
said window frame being slideably disposed within said screen such that said guide tab projects through said guide slit.

15. The music training aid of claim 14 wherein said guy lines comprise two lines and are threaded diagonally through opposite guy line openings and attached to said window frame support at opposite diagonal corners thereof.

16. A music training aid comprising:
(1) a screen of a size suitable to cover a sheet of music and having
    (a) two vertically extending windows, one on each side thereof, said windows having widths suitable to expose a limited number of music symbols of said sheet of music, and
    (b) a vertically extending guide slit at its approximate center; and
(2) a vertically slideable window frame comprising a rectangular sheet of material having a longitudinal dimension approximating twice the width of said screen, and having
    (a) guide tabs at opposite longitudinal ends thereof,
    (b) a vertically extending tab slit at the approximate center thereof, and
    (c) two sets of window frame openings on each longitudinal side thereof, each of said window frame openings having a width approximating the width of the corresponding of said windows and a length corresponding to two staves of notes of said sheet of music;
said window frame being foldable in relation with said screen such that said guide tabs protrude through said tab slit and said guide slit and each of said sets of window frame openings forms a sight opening with the corresponding of each window of said screen.

17. The music training aid of claim 16 wherein the width of one of said windows is substantially greater than the width of the other of said windows.

References Cited in the file of this patent
UNITED STATES PATENTS 1,456,670    Brown ---------------- May 29, 1923

FOREIGN PATENTS 336,647    Great Britain ----------- Oct. 13, 1930